(12) United States Patent
Heilmann et al.

(10) Patent No.: US 6,718,024 B1
(45) Date of Patent: *Apr. 6, 2004

(54) SYSTEM AND METHOD TO DISCRIMINATE CALL CONTENT TYPE

(75) Inventors: Craig Heilmann, San Antonio, TX (US); Todd Beebe, Katy, TX (US); David Buntin, San Antonio, TX (US); Greg Schmid, San Antonio, TX (US); Robert A. Applonie, San Antonio, TX (US); Keith S. Pickens, San Antonio, TX (US)

(73) Assignee: SecureLogix Corporation, San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/572,516

(22) Filed: May 17, 2000

Related U.S. Application Data

(63) Continuation-in-part of application No. 09/210,347, filed on Dec. 11, 1998.

(51) Int. Cl.[7] .................................................. H04M 3/00
(52) U.S. Cl. ........................ 379/189; 379/196; 379/200
(58) Field of Search .............................. 379/93.24, 156, 379/157, 188, 189, 196, 198, 93.09, 93.11, 93.02, 200

(56) References Cited

U.S. PATENT DOCUMENTS

| | | |
|---|---|---|
| 4,332,982 A | 6/1982 | Thomas |
| 4,639,557 A | 1/1987 | Butler et al. |
| 4,653,085 A | 3/1987 | Chan et al. |
| 4,783,796 A | 11/1988 | Ladd |
| 4,876,717 A | 10/1989 | Barron et al. |
| 4,905,281 A | 2/1990 | Surjaatmadja et al. |
| 5,018,190 A | 5/1991 | Walker et al. |
| 5,276,529 A | 1/1994 | Williams |
| 5,276,731 A | 1/1994 | Arbel et al. |
| 5,311,593 A | 5/1994 | Carmi |
| 5,351,287 A | 9/1994 | Bhattacharyya et al. |
| 5,557,742 A | 9/1996 | Smaha et al. |
| 5,623,601 A | 4/1997 | Vu |
| 5,684,957 A | 11/1997 | Kondo et al. |
| 5,805,686 A | 9/1998 | Moller et al. |
| 5,805,803 A | 9/1998 | Birrelle et al. |

(List continued on next page.)

FOREIGN PATENT DOCUMENTS

| | | |
|---|---|---|
| CA | 2094412 | 4/1993 |
| CA | 2221365 | 11/1997 |
| WO | WO 96/22000 | 7/1996 |
| WO | WO 98/17072 | 4/1998 |
| WO | WO 98/53635 | 11/1998 |

OTHER PUBLICATIONS http://www.tlogic.com/penetration.html.
http://www/m–tech.ab.ca/security/penetration.
http://www.m–tech.ab.ca/products/secmod/.
www.sandstorm.net/phonesweep; Sandstorm Enterprises, Inc. "Introducing PhoneSweep".
www.bruck–inc.com/html/security/pentesting.htm; "Penetration Test".

*Primary Examiner*—Bing Bui
(74) *Attorney, Agent, or Firm*—Jenkens & Gilchrist, P.C.

(57) ABSTRACT

A system and method for discriminating call content types for individual telephone lines at a plurality of user sites outside of a Public Switched Telephone Network (PSTN) is described. The system includes: a database containing security rules for each of a plurality of extensions, the rules specifying actions to be taken based upon a call content type of the call on the extension, wherein the call content type is determined at the user sites outside the PSTN; and a line sensor within the user sites outside the PSTN for determining the call content type of the call. The line sensor continuously checks the call content type to determine if the call content type changes.

18 Claims, 7 Drawing Sheets

U.S. PATENT DOCUMENTS

| | | |
|---|---|---|
| 5,812,763 A | 9/1998 | Teng |
| 5,826,014 A | 10/1998 | Coley et al. |
| 5,838,682 A | 11/1998 | Dekelbaum et al. |
| 5,854,889 A | 12/1998 | Liese et al. |
| 5,864,666 A | 1/1999 | Shrader |
| 5,892,903 A | 4/1999 | Klaus |
| 5,918,019 A | 6/1999 | Valencia |
| 5,923,849 A | 7/1999 | Venkatraman |
| 5,931,946 A | 8/1999 | Terada et al. |
| 5,944,823 A | 8/1999 | Jade et al. |
| 5,949,864 A | 9/1999 | Cox |

SYSTEM AND METHOD TO DISCRIMINATE CALL CONTENT TYPE

CROSS-REFERENCE TO RELATED APPLICATIONS

This application is a continuation-in-part of U.S. patent application Ser. No. 09/210,347 entitled TELEPHONY SECURITY SYSTEM filed Dec. 11, 1998, assigned to the assignee of the present application and incorporated by reference in its entirety.

TECHNICAL FIELD

The invention relates generally to telecommunications access control systems and, more particularly, to a system and method which permits a telecommunications firewall to enforce a security policy based on discrimination between a plurality of call content types and to autonomously terminate the call in enforcement of the security policy.

BACKGROUND OF THE INVENTION

Data network users in today's corporations and government agencies can easily add unauthorized modems to their computers to facilitate remote login. This is often done with innocuous intentions, but is a serious network security issue nonetheless. Rogue modems—modems that are not authorized by the organization, but have been connected to a computer system by an employee, circumvent the traditional Internet firewall, routers and intrusion detection systems.

With a rogue modem having opened the "back door" of the security perimeter, the organization's network is vulnerable to "hackers" or "phreakers" attempting to access the private data network via the Public Switched Telephone Network (PSTN). Unscrupulous individuals with larcenous or malicious intent can use a war dialer to seek out and identify insecure modems, penetrate their computer systems and gain access to the data network beyond.

An additional vulnerability involves authorized users performing unauthorized activities from within the private network. This is of special concern in high-security environments where outside transmissions are normally carefully monitored to ensure corporate or government secrets are not inadvertently or deliberately transmitted.

Telecommunication firewalls, such as the device described in U.S. Pat. No. 6,249,575 entitled TELEPHONY SECURITY SYSTEM to the same assignee are recently-developed devices that protect an organization's data network from access via telephony resources. A telecommunications firewall is configured with a user-defined security policy that is downloaded to one or more line sensors installed in-line on the user's side of the demarcation line. A line sensor determines the plurality of call attributes comprising call source, estimation and call content type from the call passing through the line sensor. Prescribed actions (including that of the line sensor allowing or denying the call) are performed based upon the call attributes determined and the security policy.

Although the line sensor is capable of determining a plurality of call attributes, the call content type (e.g., whether the call content is voice, fax or data), is a pivotal attribute in the security rules that address many of the calls that a telecommunications firewall is designed to detect and/or terminate. For instance, a modem transmission from a line that is designated for only voice use is indicative of a rogue modem. A data transmission to a voice-designated line is indicative of a possible hacking attempt, or again, a rogue modem on the line. An after-hours voice call or modem transmission from a line designated for fax use is indicative of an unauthorized call or possible espionage.

Very clever hackers may attempt to penetrate data networks by emulating one type of call to get past the firewall, then change to another type once the call is allowed. Therefore, changes in call content type are highly suspect and a security policy may require termination of such a call.

However, some government agencies such as the FBI and the CIA, the military and some NATO agencies, use a telephone encryption device known as Secure Telephone Unit-III (STU-III), to conduct classified conversations or transmit classified data. A STU-III may be used as a typical telephone to initiate a call, but when users "go secure" by turning an encryption-activation key, the voice conversation is digitized at the unit, encrypted and then transmitted using a standard modem to the receiving STU-III device where the process is reversed. The term "STU-III-voice" is used herein to refer to the call content type of a STU-III encrypted voice transmission.

A STU-III device is also used as a modem to transmit data to another STU-III location. In the "data modem" mode, the data is encrypted before it is sent to the receiving STU-III device. The term "STU-III data" is used herein to refer to the call content type of a STU-III encrypted data transmission.

Obviously the change in call content type when a STU-III transmission goes from insecure voice to secure data would be permitted in a security policy. Therefore a further discrimination between the voice band data of STU-III encrypted call content types and that of typical data (modem) and fax content types is needed.

A plurality of telecommunications fraud prevention devices exist which use and determine call-type attributes such as if the call is made from a pay phone, if it is cellular originated or terminated, if it is made to/from a number or country code with a high occurrence of billing fraud, if the call is long distance, toll free, a credit card call, etc. However, call-type attributes such as these are not relevant to protecting a private data network from unauthorized access via the telecommunications network. Additionally, devices such as these do not continue to discriminate content type after the call is connected.

Other devices are capable of detecting calls that violate a security policy, but cause time delays and a drain on manpower resources because they require notices to be sent to supervisory personnel for either approval to terminate or for manual follow-through by personnel to ultimately terminate the call.

Still other devices include components for classifying telephone signals, but none of these devices comprise the comparable arrangement of single, combined transmit and receive signal processing, continuous content discrimination and autonomous call termination capabilities needed for the specialized task of protecting a private data network from unauthorized access via the telecommunications network.

Therefore, what is needed is a system and method by which an in-line sensor continuously discriminates between call content types comprising voice, fax, data (modem), STU-III voice and STU-III data (modem) using inputs derived from analysis of the call passing through the sensor, and then autonomously enforces a security policy.

SUMMARY OF THE INVENTION

The present invention, accordingly, provides a system and method for an in-line sensor to enforce a security policy by discriminating between call content types including voice, fax, data (modem), STU-III voice and STU-III data (modem), and to continue to enforce the security policy against an allowed call, discriminating content type changes after the call is connected. Inbound and outbound calls are allowed or denied (i.e., blocked or "hung-up") according to a security policy that is managed by a security administrator. If the call violates security policy at any time, the call is autonomously terminated.

To this end, in one embodiment, the line sensor processes the combined signal from both the transmit and the receive side of the communication channel as one single signal. Filtered tonal events as well as raw signal frequency and energy indices are used to discriminate between voice and voice band data (VBD) content type. Voice band data is considered herein to be any modulated data output by devices such as a fax, modem, or a secured STU-III. Further discrimination between voice and a plurality of VBD content types (fax, data modem and STU-III), is provided by a content type discrimination state machine which uses tonal event notices, the output of the previously mentioned frequency and energy statistical analysis between voice and VBD, and demodulated signal analysis. The line sensor operates in a continuous processing loop, continuing to discriminate call content type after the call is connected.

A system and method for discriminating call content types for individual telephone lines at a plurality of user sites outside of a Public Switched Telephone Network (PSTN) is described. The system may include: a database containing security rules for each of a plurality of extensions, the rules specifying actions to be taken based upon a call content type of the call on the extension, wherein the call content type is determined at the user sites outside the PSTN; and a line sensor within the user sites outside the PSTN for determining the call content type of the call. The line sensor continuously checks the call content type to determine if the call content type changes.

Alternate embodiments are contemplated whereby other VBD content types such as transmissions from a teletypewriter (TTY) device (used by deaf or speech-impaired individuals), are discriminated from fax, data (modem), STU-III voice and STU-III data to allow additional content type-specific security policy rules to be implemented.

In another alternate embodiment it is contemplated that discrimination of fax and data (modem) content type is further refined to discriminate transmission protocols and/or host-based applications, thereby allowing implementation of protocol-dependent or application-dependent security policy rules. Such rules require use of an "organizationapproved" or more highly secure protocols and applications in order for calls to be allowed.

An additional alternate embodiment is contemplated whereby the information from the transmit side and the receive side of the communication channel is processed separately instead of being combined into one single signal.

A technical advantage achieved with the invention is the ability to discriminate between call content types comprising voice, fax, data modem, STU-III voice and STU-III data, thereby providing call attributes that are critical to protecting a data network from access via telecommunications resources.

Another technical advantage achieved with the invention is the ability to discriminate if the call type changes after the call is connected, thereby providing protection from hackers emulating one call type and later changing once the call is connected, while still allowing STU-III calls.

Another technical advantage is the ability to autonomously terminate a call if it is in violation of the security policy, thereby eliminating unacceptable time delays or manpower requirements.

Yet another technical advantage achieved with the invention is the ability to process a single, combined transmit and receive signal, thereby achieving efficient and minimal use of processing resources.

BRIEF DESCRIPTION OF THE DRAWINGS

The novel features believed characteristic of the invention are set forth in the appended claims. The invention itself, however, as well as other features and advantages thereof, will be best understood by reference to the description which follows, read in conjunction with the accompanying drawings wherein:

DETAILED DESCRIPTION OF THE PREFERRED EMBODIMENTS

The present invention can be described with several examples given below. It is understood, however, that the examples below are not necessarily limitations to the present invention, but are used to describe typical embodiments of operation.

Figure 1:
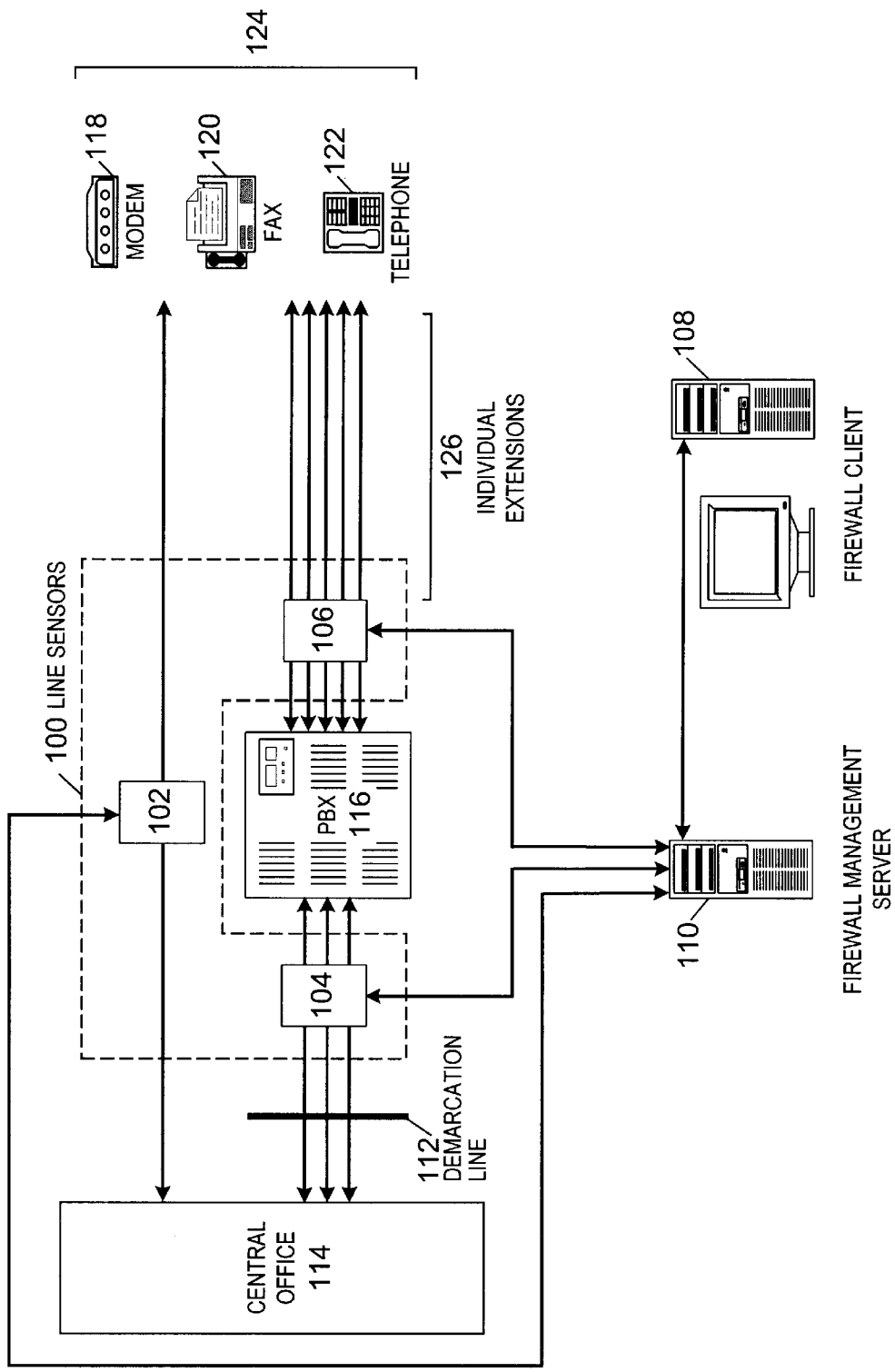
FIG. 1 is a schematic block diagram of an exemplary telecommunications firewall.

FIG. 1 is a schematic block diagram of an exemplary telecommunications firewall similar to the one implemented as shown and described in U.S. Pat. No. 6,249,575 comprising a plurality of line sensors 100 of the present invention (designated by a line sensor 102, 104 and 106), a firewall client 108, and a firewall management server 100, all electrically connected for interaction as described below.

The firewall client 108 is a point of user interface for configuring a security policy, displaying and viewing real-time alerts, printing event logs, reports, and other operational features of the telecommunications firewall.

The firewall management server 110 receives the security policy from the firewall client 108 and pushes a copy of the security policy to each line sensor 100. Each line sensor 100 receives the security policy from the firewall management server 110, monitors incoming and outgoing calls, and allows, denies, or otherwise manipulates calls in accordance with the security policy and based on a plurality of call attributes including call content type.

The line sensor 100 is connected in-line, on the user's side of a demarcation line 112 between a central office 114 and public branch exchange (PBX) 116, whereby connectivity may be a combination of direct connects at line sensor 102, PBX trunk-side connections at line sensor 104, or PBX station-side connections at line sensor 106. Line sensors 104–106 are not required at all of these points, but can be installed in accordance with the configuration of lines and the user's desired level of security control.

Also in FIG. 1, numerals 118, 120, and 122 designate end-user stations 124, representing as examples, one or more modems 118, fax machines 120, and telephones 122. The modems 118 may be connected to a desktop or portable personal computer. Individual extensions 126 connect each of the stations 124 at line sensor 106 (or to the PBX 116 if this configuration of line sensor is not present).

Figure 2A:
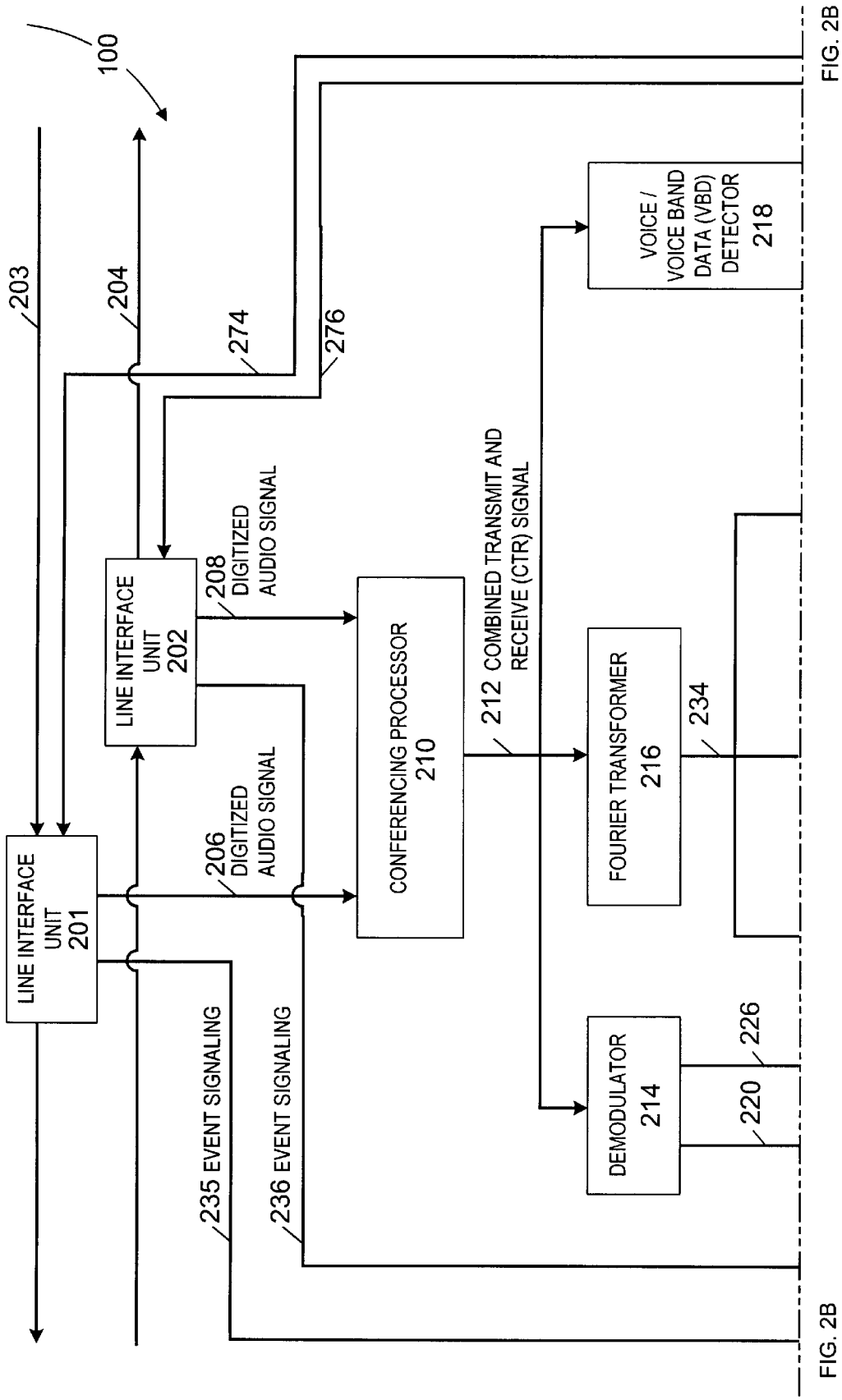
FIGS. 2A and 2B illustrate a schematic block diagram of the preferred embodiment of the present invention.
Figure 2B:
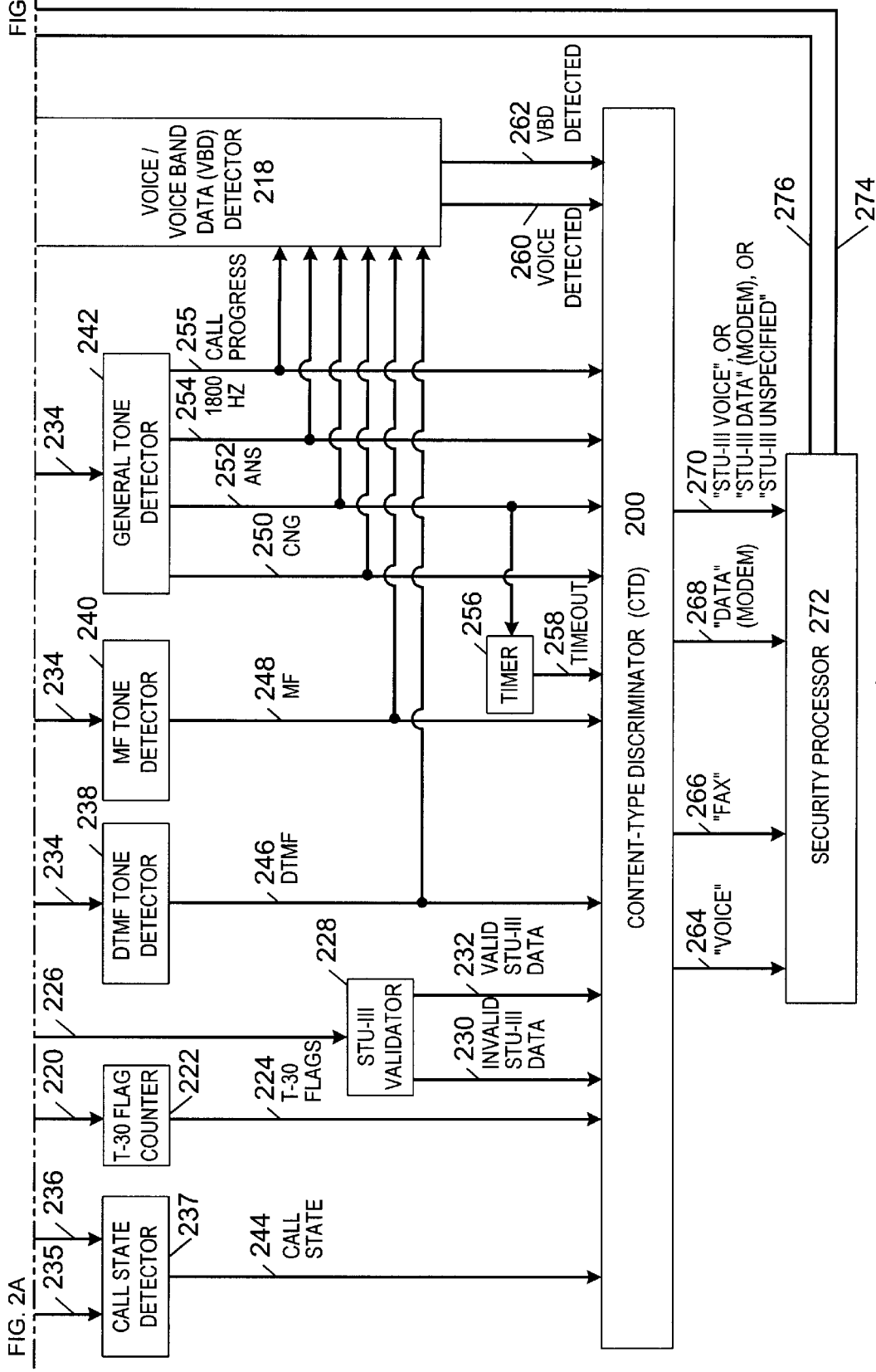

FIGS. 2A and 2B illustrate the line sensor 100 by which inputs are made into a content type discriminator (CTD) 200, which operates to discriminate the content type of an inbound or outbound call passing through the line sensor.

A line interface unit (LIU) 201, and a LIU 202 continuously monitors traffic on both a transmit side 203 and a receive side 204 of a plurality of communication channels. The LIUs 201 and 202 send a copy of a digitized audio signal 206 and 208 to a conferencing processor 210. Although it is not shown, it is understood that in some telephone line protocols, both the receiving and transmitting signal are present on the same wire pair, thereby requiring only one LIU. If this is not the case, the conferencing processor 210 combines the separate signals into a combined transmit and receive (CTR) signal 212. The CTR signal 212 is sent to a demodulator 214, a Fourier transformer 216, and a voice/voice band data (V/VBD) detector 218.

The demodulator 214 is representative of a plurality of modems operating at protocols comprising V.21 and Bell 103. V.21 demodulation is used to detect T-30 flags, which are indicative of fax handshaking. V.21 demodulated data 220 is sent to a T-30 flag counter 222. If a sequence of m T-30 flags is detected; where m is a predetermined number of a consecutive series of T-30 flags sufficient to indicate standard fax handshaking and not just random data equivalent to a T-30 flag; a T-30 flag notice 224 is sent to the CTD 200. Similarly, Bell 103 protocol is used to detect STU-III handshaking. Bell 103 demodulated data 226 is sent to a STU-III validator 228. The data is evaluated against STU-III specifications, and either an invalid STU-III data notice 230 or a valid STU-III data notice 232 specifying the type of STU-III content (STU-III voice, STU-III data, or STU-III unspecified), is sent to the CTD 200.

In the Fourier transformer 216, an algorithm based on the Fourier transform is used to transform the CTR signal 212 into spectral components (frequency/amplitude pairs), that define the frequency content. A copy of the transform result 234 is sent to a DTMF tone detector 238, an MF tone detector 240 and a general tone detector 242, each of which filter and analyze the transform result 234 for the presence of specific tonal frequencies.

The DTMF tone detector 238 and the MF tone detector 240 look for the presence of DTMF and MF tones. The general tone detector 242 analyzes the transform result 234 for CNG (fax), ANS (modem), and 1800 Hz (STU-III) tones, as well as common call progress tones (ring back, busy, and/or dial tone).

The presence of DTMF tones is reported to the CTD 200 and the V/VBD detector 218 via a DTMF notice 246. The presence of MF tones is reported to the CTD and the V/VBD detector via an MF notice 248. The presence of general tones (CNG, ANS, 1800 Hz, ring back, busy, and/or dial tones) is reported to the CTD and the V/VBD detector via a CNG notice 250, an ANS notice 252, an 1800 Hz notice 254 and/or a call progress notice 255. Additionally, the ANS notice 252 is sent to a timer 256. The timer 256 sends a timeout notice 258 to the CTD 200 n milliseconds after receiving the ANS notice 252, where n is sufficient elapsed time for an 1800 Hz tone to be issued during standard STU-III modem negotiation.

The V/VBD detector 218 analyzes all inputs, to provide a voice detected notice 260 or a VBD detected notice 262, (indicative of the presence of either voice or voice band data on the line), to the CTD 200.

The LIUs 201 and 202 also send a copy of call event signaling 235 and 236 to a call state detector 237. The call state detector 237 reports "off-hook" and "on-hook" events to the CTD 200 via a call state notice 244.

The CTD 200 analyzes all inputs to provide a content type discrimination notice, specifically either a content type "voice" notice 264, a content type "fax" notice 266, a content type "data" (modem) notice 268, or a content type "STU-III" notice 270 (indicating either STU-III voice, STU-III data, or STU-III unspecified).

The content type notice 264–270 is sent to a security processor 272 that is pre-programmed with the security policy to meet the user's security needs, which may include terminating the call. If the security policy dictates that the call should be terminated, the security processor 272 sends signals 274 and 276 to the LIUs 201 and 202, thereby terminating the call. Configurations of the line sensor 100 call termination circuitry varies depending upon the line medium (e.g., analog, T1 and ISDN), and are discussed below with reference to FIGS. 5, 6A, 6B and 7.

Figure 3:
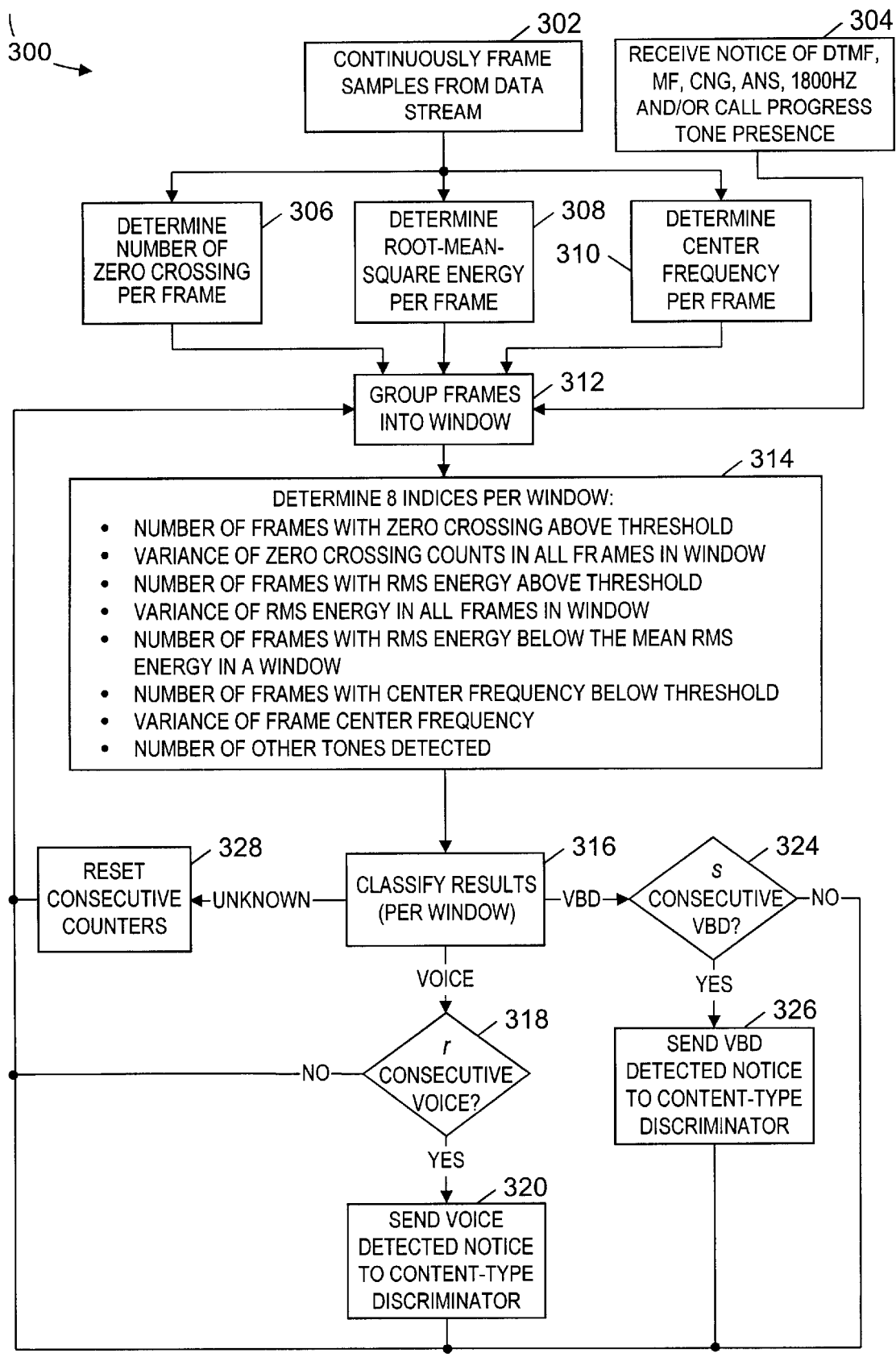
FIG. 3 is a flow diagram illustrating discrimination between voice and voice band data by the system of FIGS. 2A and 2B.

FIG. 3 illustrates the process 300 whereby the V/VBD detector 218 discriminates the content type of a call as either voice or VBD based on the plurality of inputs shown in FIGS. 2A and 2B. It is understood that the line sensor 100 is operates in a continuous loop, continuously and simultaneously discriminating call content type on a plurality of telecommunication lines/channels.

The V/VBD detector 218 continuously receives the CTR signal 212, takes p samples of the data stream and creates a frame, as shown in step 302, where p represents any predetermined number of samples. The V/VBD detector 218 also receives notice of the presence of any DTMF, MF, CNG, ANS, 1800 Hz, and/or call progress tones from the DTMF tone detector 238, MF tone detector 240 and general tone detector 242, as shown in step 304.

Copies of each frame of p samples are simultaneously statistically analyzed in steps 306, 308 and 310. In step 306, an algorithm is processed on each frame to determine the number of zero crossings within the frame. Voice content generally has lower zero crossing counts than data content.

In step 308, an algorithm is processed on each frame to determine the Root-Mean-Square (the energy) of the frame. If the frame contains mostly silence, this value is low, but if it contains a loud noise the value is high. Voice content generally has lower energy than data content.

In step 310, an algorithm is processed on each frame to determine the center frequency of all the frequencies contained in the frame. If the frame contains higher frequency components, the center frequency is higher. Voice content generally has a lower center frequency than data content.

The frames are grouped into a window containing q frames in step 312, where q represents the number of frames totaling approximately one second in duration. The statistical results of step 306, 308 and 310 are tabulated for each frame and used in step 314 to determine the following eight indices associated with each window:
1. Number of frames with zero crossing counts above a threshold;
2. Variance of the zero crossing counts in total (q) frames in window;
3. Number of frames with RMS energy above a threshold;
4. Variance of the RMS energy in total (q) frames in window;
5. Number of frames with RMS energy below the mean RMS Energy in a window;
6. Number of frames with center frequency below a threshold;
7. Variance of frame center frequency; and
8. Number of other tones detected.

The indices for each window are processed by a classification algorithm in step 316. Hard thresholds are used to analyze the indices and provide a call content type output of "voice", "VBD" or "unknown" for each window.

The "per window" voice outputs from step 316 are tracked and counted. If r consecutive windows indicate voice in step 318; where r represents any predetermined number of windows; the call content type is classified as voice, and a voice detected notice 260 is sent to the CTD 200 in step 320.

If the "per window" output from step 316 is "VBD", it is also tracked and counted. If s consecutive windows indicate VBD in step 324, the call content type is classified as VBD and a VBD detected notice 262 is sent to the CTS 200 in step 326.

If the "per window" output from step 316 is "unknown", the counters for both the voice and VBD used in step 318 and 324 are reset to zero in step 328. In each scenario resulting from the classification output of step 316, a process loop is applied whereby the next consecutive window of frames is processed and classified, and outputs are provided to the security processor 272 accordingly.

In an alternate embodiment, use of a neural network is contemplated to "learn" content type patterns and thresholds for use in discriminating between voice and VDB, as well as discriminating between fax, data (modem), STU-III voice and STU-III data. The neural network builds a feature map during an initial learning period of the patterns and thresholds associated with the call content types found in day-to-day telecom usage.

It is also contemplated that the neural network may be operated in an adaptive fashion. If a call content type falls outside known patterns and thresholds, a verification of the call content type is provided by administrators and the neural network updates the feature map to add new patterns and thresholds as they emerge over time.

Figure 4:
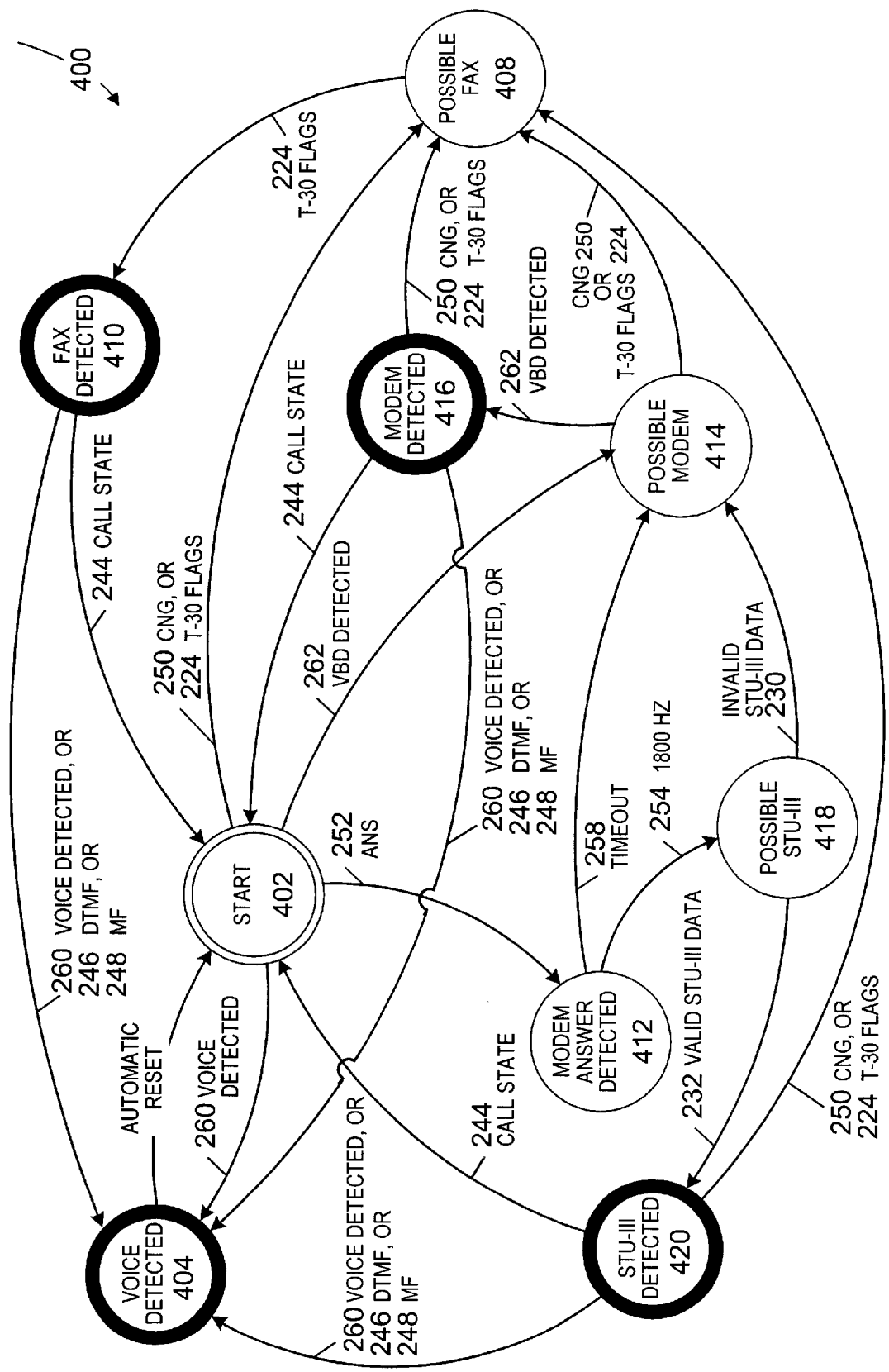
FIG. 4 is a is a state transition diagram illustrating further discrimination of voice or voice band data content types by the system of FIG. 2B.

FIG. 4 is a state transition diagram illustrating the process 400 whereby the CTD 200 further refines the discrimination of voice or VBD received from the V/VBD detector 218, thereby determining if the VBD content type is fax, data (modem), STU-III voice or STU-III data, based on the plurality of inputs shown in FIG. 2B. It will become evident that the state of the CTD 200 is fluid, transitioning from a start state 402 to a plurality of other states as appropriate, in response to inputs derived from the call passing through the line sensor 100. It is not shown nor stated below, but it is understood that prior to transitioning from the start state 402, a call state notice 244 reporting an "off hook" event is received by the CTD 200 from the call state detector 237.

Prior to call connection, the CTD 200 transitions to the start state 402. If the voice detected notice 260 is received, the CTD transitions to a voice detected state 404, thereby providing the content type "voice" output 264. The CTD then automatically resets itself and transitions back to the start state 402 to detect any change in the call content type.

If the CTD 200 is in the start state 402 and receives either the CNG notice 250 or the T-30 flags notice 224. The CTD transitions to a possible fax state 408. If a second T-30 flags notice 224 is received, the CTD transitions to a fax detected state 410, thereby providing the content type "fax" output 266. When the call state notice 244 reporting an "on-hook state" is received, the CTD returns to the start state 402.

However, if the CDT 200 is in the fax detected state 410 and the fax handset is used to place a voice call during the fax transmission, either the voice detected notice 260, the DTMF notice 246, or the MF notice 248 is received and the CTD transitions to the voice detected state 404, thereby providing the content type "voice" output 264.

If the CTD 200 is in the start state 402 and receives a VBD detected notice 262, the CTD transitions to a possible modem state 414. If a second VBD detected notice 262 is received, the CTD transitions to a modem detected state 416, thereby providing the content type "data (modem)" output 268. If the call state notice 244 reporting an "on-hook state" is received, the CTD returns to the start state 402.

When the CTD 200 is in either the possible modem state 414, the modem detected state 416, or the STU-III detected state 420, if either the CNG notice 250 or the T-30 flags notice 224 is received, the CTD transitions to the possible fax state 408. As previously discussed, if a second T-30 flags notice 224 is received, the CTD transitions to the fax detected state 410, thereby providing the content type "fax" output 266. If the call state notice 244 reporting an "on-hook state" is received, the CTD returns to the start state 402.

If the CTD 200 is in the start state 402 and receives the ANS notice 252, the CTD transitions to a modem answer detected state 412. The CTD then awaits additional input to discriminate between fax, data (modem) or STU-III content type. If a timeout notice 258 is received prior to any other input such as the 1800 Hz notice 254, the CTD transitions to the possible modem state 414 and awaits further input. If the 1800 Hz notice 254 is received, the CTD transitions to a possible STU-III state 418.

While in the possible STU-III state 418, the CTD awaits the collection and validation of Bell 103 data by the STU-III validator 228. If the invalid STU-III data notice 230 is received, the CTD transitions to the possible modem state 414 and awaits further input. If the valid STU-III data notice 232 is received, the CTD transitions to a STU-III detected state 420, thereby providing the content type "STU-III voice", "STU-III data" or "STU-III unspecified" output 270, as indicated in the valid STU-III data notice 232. If the call state notice 244 reporting an "on-hook state" is received, the CTD returns to the start state 402. However, if either the voice detected notice 260, the DTMF notice 246, or the MF notice 248 is received, the CTD transitions to the voice detected state 404, thereby providing the content type "voice" output 264.

Additionally, although not shown, if the call ends or an "on hook" call state notice 244 is sent from the call state detector 237 to the CTD 200, the state machine to will transition back to start. This can happen at any state, but for clarity is shown only at states 410, 416 and 420.

Figure 5:
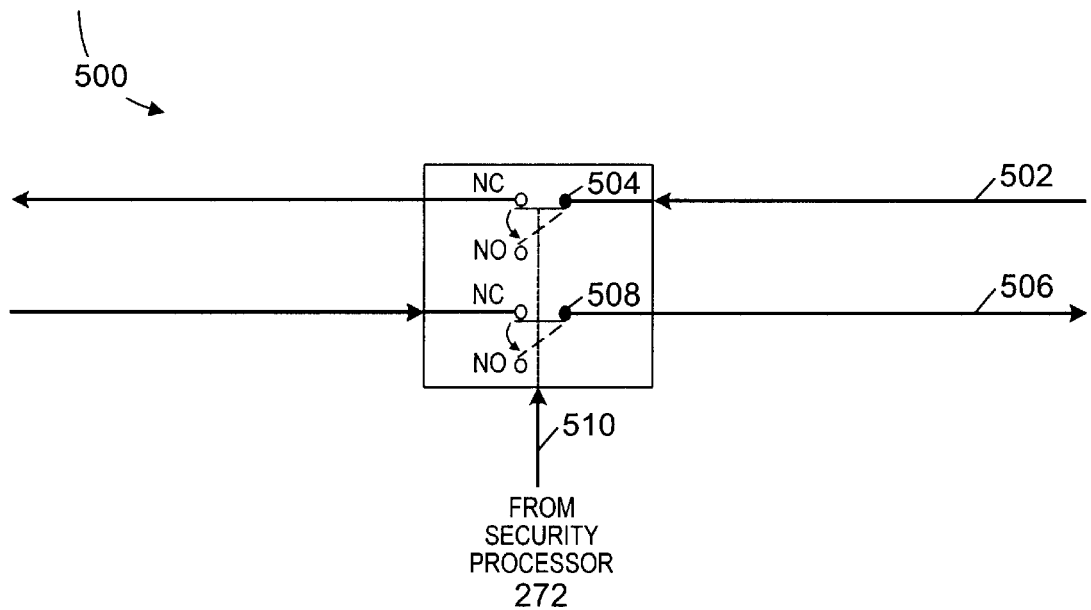
FIG. 5 is a schematic block diagram of the call termination circuitry for analog lines in the present invention.

FIG. 5 illustrates a schematic block diagram of a call termination circuitry 500 for analog lines in the present invention. When the line sensor 100 is installed in an analog line, a tip conductor 502 is connected to a relay 504 and a ring conductor 506 is connected to a relay 508. The relays are normally closed such that in case of a power failure or reset, the relays remain closed, thereby allowing calls to occur without interruption. If the security processor 272 determines a call is in violation of the security policy, it sends a signal 510 to the relays 506 and 508, thereby opening the relays and terminating the call. While not shown, it is understood that alternative devices other than relays, including but not limited to a transistor or switch, may be used to break the electrical connection and terminate the call.

In an alternate embodiment of the call termination circuitry for analog lines, the relays are normally open such that in case of a power failure or reset, the relays remain open, thereby interrupting all calls until transmissions is monitored by the line sensor 100.

In another alternate embodiment of the call termination circuitry for analog lines, receiving and transmitting circuits are placed in-line with the telephone line, allowing the line sensor to manipulate the signal before re-transmitting it. This configuration allows "blanking" the call by transmitting silence or sending an audio message.

Figure 6A:
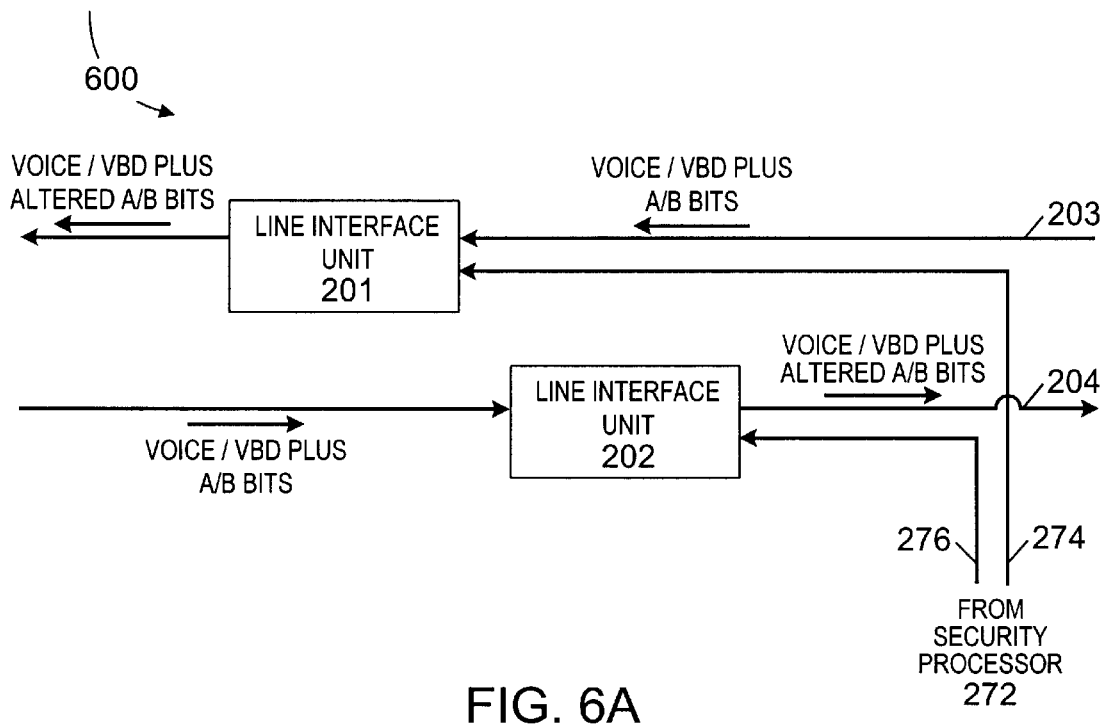
FIG. 6A is a schematic block diagram of one embodiment of the call termination circuitry for T1 lines in the present invention.

FIG. 6A illustrates a schematic block diagram of one embodiment of a call termination circuitry 600 for T1 lines in the present invention. When the line sensor 100 is installed in a T1 line, signal receiving and transmitting circuitry is in-line with the existing T1 line. In this configuration, the line sensor 100 electrically receives and re-transmits the T1 signal traveling in both the transmit side 203 and the receive side 204 of the communication channel. The security processor 272 is capable of manipulating the T1 data that travels between the receiving and transmitting circuits. If the call is allowed, the security processor 272 does not alter the A/B bits and the data is re-transmitted the same as it is received. If the security processor 272 determines a call is in violation of the security policy, the signals 274 and 276 are sent to the receiving and transmitting circuits and then transmitted, and contain altered A/B signaling bits plus voice/VBD, thereby signaling the end of the call to the central office 114 and the PBX 116.

Figure 6B:
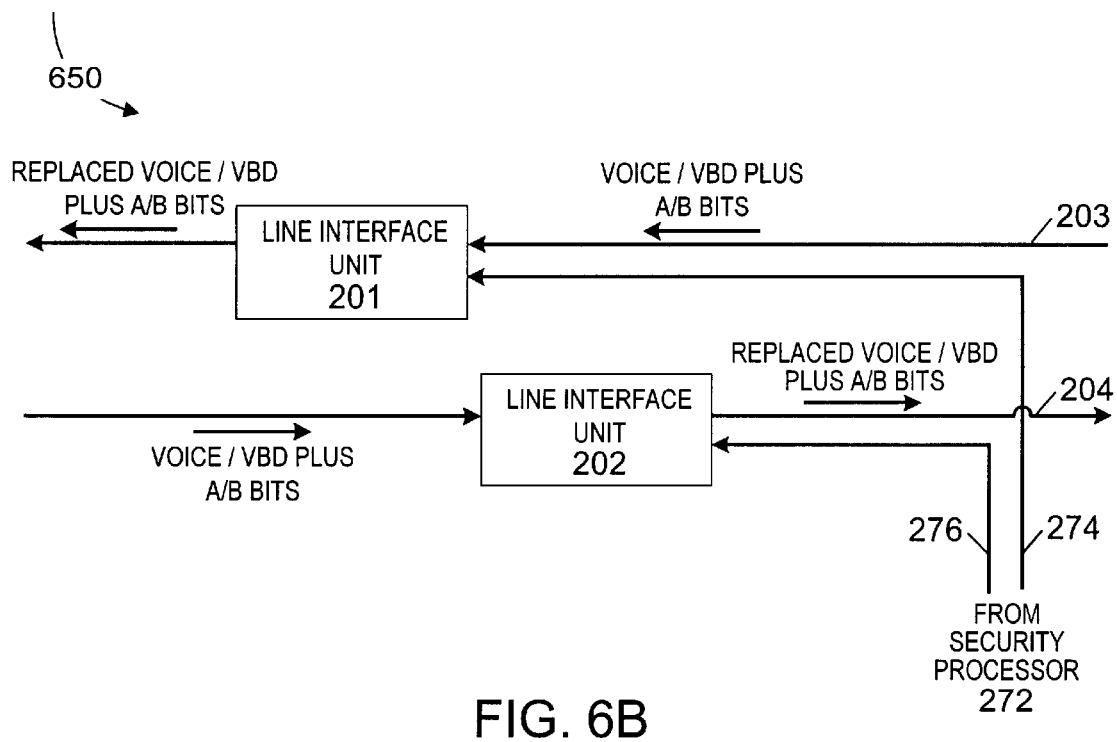
FIG. 6B is a schematic block diagram of an alternate embodiment of call termination circuitry for T1 lines in the present invention.

FIG. 6B illustrates a schematic block diagram of an alternate embodiment of a call termination circuitry 650 for T1 lines in the present invention. Connections and configurations are similar to those described for FIG. 6A. The security processor 272 is capable of manipulating the T1 data that travels between the receiving and transmitting circuits. If the security processor 272 determines a call is in violation of the security policy, the signals 274 and 276 are sent to the receiving and transmitting circuits and then transmitted, and contain the A/B bits plus altered voice/VBD of digital silence, an audio message, or some other voice data sequence to convey termination to the call parties. If the call is allowed, the security processor 272 does not alter the data and it is re-transmitted the same as it is received.

Figure 7:
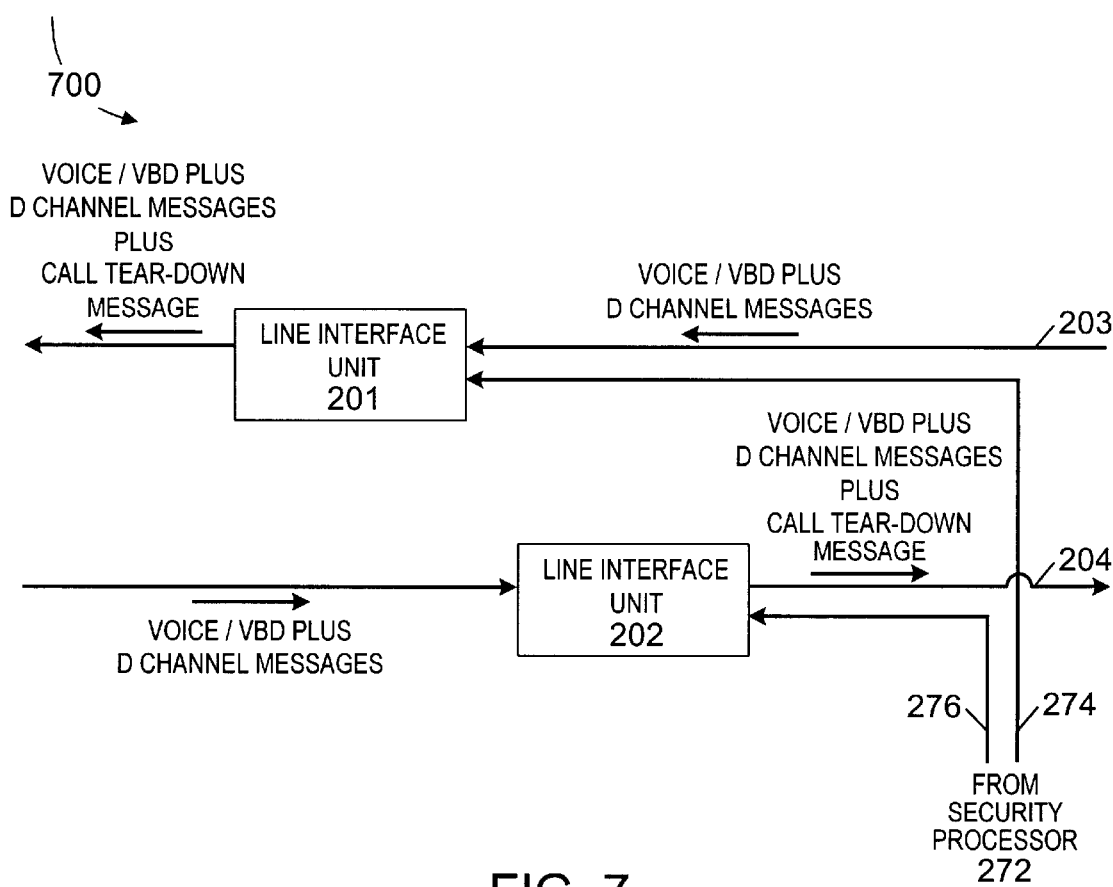
FIG. 7 is a schematic block diagram of the call termination circuitry for ISDN lines in the present invention.

FIG. 7 illustrates a schematic block diagram of a call termination circuitry 700 for ISDN lines in the present invention. When the line sensor 100 is installed in an ISDN line, signal receiving and transmitting circuitry is in-line with the existing ISDN line. In this configuration, the line sensor 100 electrically receives and re-transmits the ISDN signal traveling in both the transmit side 203 and the receive side 204 of the communication channel. The security processor 272 is capable of manipulating the ISDN data that travels between the receiving and transmitting circuits. If the call is allowed, the security processor 272 does not alter the voice/VBD nor the D channel messages. If the security processor 272 determines a call is in violation of the security policy, the signals 274 and 276 are sent to the receiving and transmitting circuits and then transmitted, and include voice/VBD plus D channel messages altered to include an ISDN tear-down message, thereby signaling the end of the call to the central office 114 and the PBX 116. The line sensor 100 handles the response messages from the central office and PBX in order to prevent corruption of the link.

It is contemplated that the call drop circuitry described above with reference to FIGS. 5, 6A, 6B, and 7 can be integrated into a large, integrated communications device such as a PBX or into another in-line device such as but not limited to a surge suppressor, repeater, CSU (Channel Service Unit), or channel bank.

Alternatively, it is contemplated that the call drop circuitry described above can be controlled via wired or wireless connections.

It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A telephony security system for discriminating call content for individual telephone lines leading to extensions at a plurality of user sites outside of a Public Switched Telephone Network (PSTN), comprising:

a database containing security rules for each of a plurality of extensions, said security rules specifying actions to be taken based upon a call content type of the call on the extension, wherein said call content type is determined at the user sites outside the PSTN; and a line sensor within the user sites outside the PSTN for determining said call content type of the call.

2. The system of claim 1 wherein said security rules include the actions of permitting or denying a call.

3. The system of claim 1 wherein said sensor continuously checks the call content type to determine if the call content type changes from first call content type to a second call content type.

4. The system of claim 3 wherein said first call content type is fax and said second call content type is data.

5. The system of claim 1 wherein said line sensor determines said call content type of the call from a combination datastream created from a receiving portion and transmitting portion of the call.

6. The system of claim 1 further including a neural network that learns new call content types.

7. The system of claim 1 wherein said line sensor determines said call content type of the call by considering an application of the call.

8. The system of claim 1 wherein said call content type of the call by considering a protocol of the call.

9. A method of telephony security for discriminating call content type for individual lines leading to extensions at a plurality of user sites outside of a Public Switched Telephone Network (PSTN), said method comprising the steps of:

defining security rules in a database for each of a plurality of extensions, said security rules specifying actions to be taken based upon a call content type of the call on the extension;

deleting and sensing calls on the extensions to determine said call content type associated with each call, said step of detecting and sensing calls occurs within the user sites outside the PSTN; and performing actions on selected calls based upon said call content type, in accordance with said security rules defined for each of a plurality of extensions, wherein said actions are performed on selected calls at the user sites outside the PSTN.

10. The method of claim 9 wherein said security rules include the actions of permitting or denying a call.

11. The method of claim 9 wherein said step of detecting and sensing calls continuously checks said call content type to determine if said call content type changes from a first call content type to a second call content type.

12. The method of claim 11 wherein said first call content type is fax and said second call content type is data.

13. The method of claim 9 wherein said step of detecting and sensing calls is performed between a public branch exchange and the extension.

14. A telephony security system for discriminating call content for individual telephone lines leading to extensions at a plurality of user sites outside of a Public Switched Telephone Network (PSTN), comprising:

a database containing security rules for each of a plurality of extensions, said security rules specifying actions to be taken based upon a call content type of the call on the extension, wherein said call content type is determined at the user sites outside the PSTN;

a line sensor within the user sites outside the PSTN for determining the call content type of the call; and means for performing actions on selected calls based upon said call content type of the call, in accordance with said security rules, wherein said actions are performed at the user sites outside the PSTN.

15. The system of claim 14 wherein said security rules include the actions of permitting or denying a call.

16. The system of claim 14 wherein said line sensor continuously checks said call content type to determine if said call content type changes from a first call content type to a second call content type.

17. The system of claim 16 wherein said first call content type is fax and said second call content type is data.

18. The system of claim 14 wherein said line sensor exists between a public branch exchange and the extension.

* * * * *